United States Patent [19]

Keller

[11] 3,922,484

[45] Nov. 25, 1975

[54] METHOD FOR THE RASTERED REPRODUCTION OF COLORED CONTINUOUS TONE IMAGES OF SINGLE OR MULTICOLOR ORIGINALS

[75] Inventor: Hans Keller, Kiel, Germany

[73] Assignee: Dr. Ing. Rudolf Hell, GmbH, Germany

[22] Filed: Dec. 19, 1973

[21] Appl. No.: 426,091

[30] Foreign Application Priority Data

Dec. 22, 1972 Germany .......................... 2262824

[52] U.S. Cl. ...................................... 178/6; 358/81

[51] Int. Cl.² ........................................ H04N 7/00

[58] Field of Search ..................... 178/6; 358/81, 82

[56] References Cited

UNITED STATES PATENTS

| | | | |
|---|---|---|---|
| 3,604,846 | 9/1971 | Behane et al. | 178/6 X |
| 3,621,126 | 11/1971 | Taudt et al. | 178/6 |
| 3,706,851 | 12/1972 | Froehlich et al. | 178/DIG. 6 X |
| 3,710,011 | 1/1973 | Altemus et al. | 358/81 |
| 3,784,736 | 1/1974 | Novak | 358/81 |
| 3,819,854 | 6/1974 | Kolb | 178/6 X |

*Primary Examiner*—Richard Murray
*Assistant Examiner*—Aristotelis M. Psitos
*Attorney, Agent, or Firm*—Hill, Gross, Simpson, Van Santen, Steadman, Chiara & Simpson

[57] ABSTRACT

A method for the rastered reproduction of colored continuous tone images in single or multi-color printing, in which the image original for the individual printing colors are separately scanned optical-electrically to form respective electrical signals which are quantized in accordance with tone value steps, with the quantized signals controlling one or more recording units by means of which a printing form for the individual printing colors is produced, and in which the surface of the printing form is divided into a network of orthogonal raster sections, and the individual raster sections being divided into several orthogonal partial areas, with one or more coverage spots being recorded in the partial areas of the printing form as printing dots, the surface coverage of which has a size corresponding to the associated tone value, the size of the dots being so determined that up to a tone value, which corresponds to the size of the smallest printable dot the coverages formed on the partial areas are recorded within the respective sections as a single coherent covering spot, that with increasing tone values an enlargement of such covering spot is effected, and when approximately twice the size of the smallest printable dot is reached, a division into two covering spots is effected within the section, that an enlargement and subsequent division of the covering spots is further effected with increasing tone values up to a predetermined tone value, and with a further increase in tone value, a decrease in size of the uncovered areas is effected until they are reduced to the smallest printable size, and with further increasing tone value the number of the uncovered areas is decreased.

3 Claims, 15 Drawing Figures

| TONE VALUES | | | COVERING SPOTS | |
|---|---|---|---|---|
| NO | BINARY NUMBER | PARTIAL AREAS | NUMBER | % |
| 0 | 0 | I+0 | 1+1 | 1,4 |
| 2 | 1 0 | II+0 | 2+1 | 2,1 |
| 4 | 1 0 0 | III+0 | 4+1 | 3,5 |
| 8 | 1 0 0 0 | IV+0 | 9+1 | 7,0 |
| 16 | 1 0 0 0 0 | V+0 | 18+1 | 13,2 |
| 32 | 1 0 0 0 0 0 | VI+0 | 36+1 | 25,6 |
| 64 | 1 0 0 0 0 0 0 | VII+0 | 72 | 50 |

METHOD FOR THE RASTERED REPRODUCTION OF COLORED CONTINUOUS TONE IMAGES OF SINGLE OR MULTICOLOR ORIGINALS

BACKGROUND OF THE INVENTION

The invention is directed to a method for the rastered reproduction of colored continuous tone images of single or multicolor originals in which the image original for the respective individual print colors is separately scanned, utilizing optical-electrical techniques and the resulting electrical signals are quantized in a pulse in accordance with the tone value steps, with the quantized signals controlling one or more recording units by means of which the form for printing the individual print colors is produced, and in which the surface area of the print form is subdivided into a network of orthogonal raster sections. The individual raster sections, in turn, are divided into a plurality of orthogonal partial areas. The signals obtained during the scanning are quantized with a pulse such that each partial area is provided with a quantization pulse, and the signals derived during the quantization effect a control of the recording unit or units whereby one or more covering spots are recorded within the partial area of the raster sections in the form of printing dots, in which the size of the surface coverage proportionally corresponds to the scanned tone value involved.

It is already known to optically-electrically scan an image original dot and line wise, in connection with the single or multicolored reproduction of continuous tone images, such as non-rastered diapositives or plan picture originals. In known devices of this type, this is accomplished by tensioning an image original over a scanning drum which is rotated, with a focused light dot directed upon the image original and guided axially thereacross during such rotation. The light beam thus traverses the image original in the form of a thin, narrow spiral line. The light, which either penetrates the original or is reflected thereby, is divided by a suitable optical system into several partial beams and conducted to optical-electrical transducers. The sensitivity of the latter and the chromatic division of the partial beams is so effected that the outputs of the respective transducers comprise the electrical signals which, in the case of a multicolor print, in accordance with suitable color correction calculations, correspond to the individual print color tone values. Such tone value signals are quantized in a pulse which is in an integral relation with respect to the subdivision of the printing form areas of the respective raster sections.

The signals obtained in the quantization operation are employed to control the reproduction recording units whereby a coherent printing area i.e. raster dot, is recorded in the individual raster sections with the surface coverage corresponding to the scanned tone value.

The reproduction best takes place with such signals controlling one or more recording units by means of which a printing form for each print color is produced which has individual printing dots corresponding to the tone values derived from the scanning operation.

The arrangement, within the respective areas, of such printing dots on the surface of the print reproduction is so effected that the individual printing dots are arranged sequentially and adjacently to each other, with the same relative orientation as the respective scanned image dots of the image original, and at the same time are disposed within the raster fields of the respective screens employed in printing operations.

This result may be achieved, for example, by the employment of a scanning drum over which the unprepared printing form has been tensioned, or which, per se, constitutes the printing form, in conjunction with a simultaneously rotated recording drum, with recording and scanning units being axially advanced relative to their respective drums. If the axial advance of the recording and scanning units, as well as the diameter and rate of revolution of the recording and scanning drums are equal, the reproduction will have the same size as the image original. However, if the drum circumferences or the reproduction rates are altered, a change in the scale of the reproduction with respect to the original may be effected.

Rasters employed in this type of reproduction comprise a periodic sectional raster arrangement whereby each printing dot is disposed into such a raster section, the length of the sides of which amount to approximately 0.2 mm, corresponding to a raster of 50 per cm. In this arrangement the printing areas are small for light tone values, while medium tone values approximate a checker board configuration. Darker tone values fill the raster section to a point where the non-printed dot surface corresponds, like a photographic negative, to the configuration for the lighter tone values. Such configurations, which are obtained, in part, photographically or by a printing technique, was substantially the pattern sample for the various known electronic raster methods, in most of which the printing dot is recorded within the raster field as a spot, with a surface coverage which is divided into at least 50 tone value steps, which in the case of binary coding usually involve $2^6$ or $2^7$ tone value steps.

An embodiment of such a method has heretofore been described in German Patent Application P 1,597,773. In this disclosure the printing dot is recorded, by a finely focused electron beam, in the form of closely adjacent recording lines on the screen of a cathode beam tube. It was further suggested that, in the recording of the printing dots within the respective raster sections, separate patterns be employed for each raster section configuration, i.e. for each raster and for each tone value to scan such pattern optically-electrically, storing the data so recorded in a storer from which it may be obtained by the use of pulse quantized signals derived from the scanning of the continuous tone image original, using the results from the storer for the desired reproduction. The purpose of such method, which has been described in German Patent Application P 2,012,728 is that by means of the initially described devices operating orthogonally on the respective sides of the scanning and recording means, raster arrangements can be recorded which are not orthogonally disposed. The technical magazine "RCA-Review", September 1970, Volume 31, No. 3, on pages 517- 533 describes a method in which the area of the raster field is composed of a number of equal dots, of the size of the smallest dot which can be printed, with the number differing in correspondence to the tone value. The smallest possible dot which can be printed covers approximately 4–8% of the raster field of usual size. In other words the maximum number of smallest possible dots which can be printed or exposed in such an area is 25. Consequently, only 25 tone value steps are possible in such a case. This, however, is insufficient for high-quality reproduction, as it results in sharp or pronounced tone value variations at the juncture of two tone value steps. A further disadvantage of such method resides in the fact that in the case of high or dark tone values, the smallest area which remains exposed within the raster field cannot be kept sufficiently large to avoid the flow of the printing color or ink therein, resulting in a further diminishing of the usable tone value steps.

BRIEF SUMMARY OF THE INVENTION

The present invention is directed to the problem of developing a new method for the rastered reproduction of continuous tone images, taking into consideration maintenance of high resolution and quality, i.e. achieving to a great degree an improvement in the sharpness as well as the absence of a Moire pattern. This is accomplished in the present invention by the employment of specific novel relationships in the printed areas whereby, for up to a tone value corresponding to the size of the smallest possible dot which can be printed, the coverage on the partial areas are recorded as a coherent covering spot within the section involved, and that with increasing tone values an enlargement of such covering spots is effected until such spot approximates twice the size of the smallest dot which can be printed, at which pont a division into two covering spots within the section is effected. With further increasing tone value, enlargement and subsequent division of the covering spot is effected up to a predetermined tone value. At this point, with further increasing tone values, the exposed or uncovered areas are reduced in size down to the smallest size which can be printed, and following further increase in tone value the number of the exposed or uncovered areas is reduced. In the case of high tone values within the various rastered sections preferably approximately two to 10 covering spots are recorded.

In an advantageous further development of the method of the invention the tone value steps are identified by binary coded numbers in which individual dots correspond to a fixed number and arrangement of covering spots within the partial areas of the raster sections, with the entire surface area corresponding to designations of the column of the binary number, and in which the covering surface area assigned to one column of the binary number increases with rising column number of the binary number by a factor of approximately 2 and in which, during recording of the tone value, the covering areas are recorded corresponding to the column in which the binary number 1 is present.

BRIEF DESCRIPTION OF THE DRAWINGS

In the drawings wherein like reference characters indicate like or corresponding parts.

DETAILED DESCRIPTION OF THE INVENTION

Figure 1:
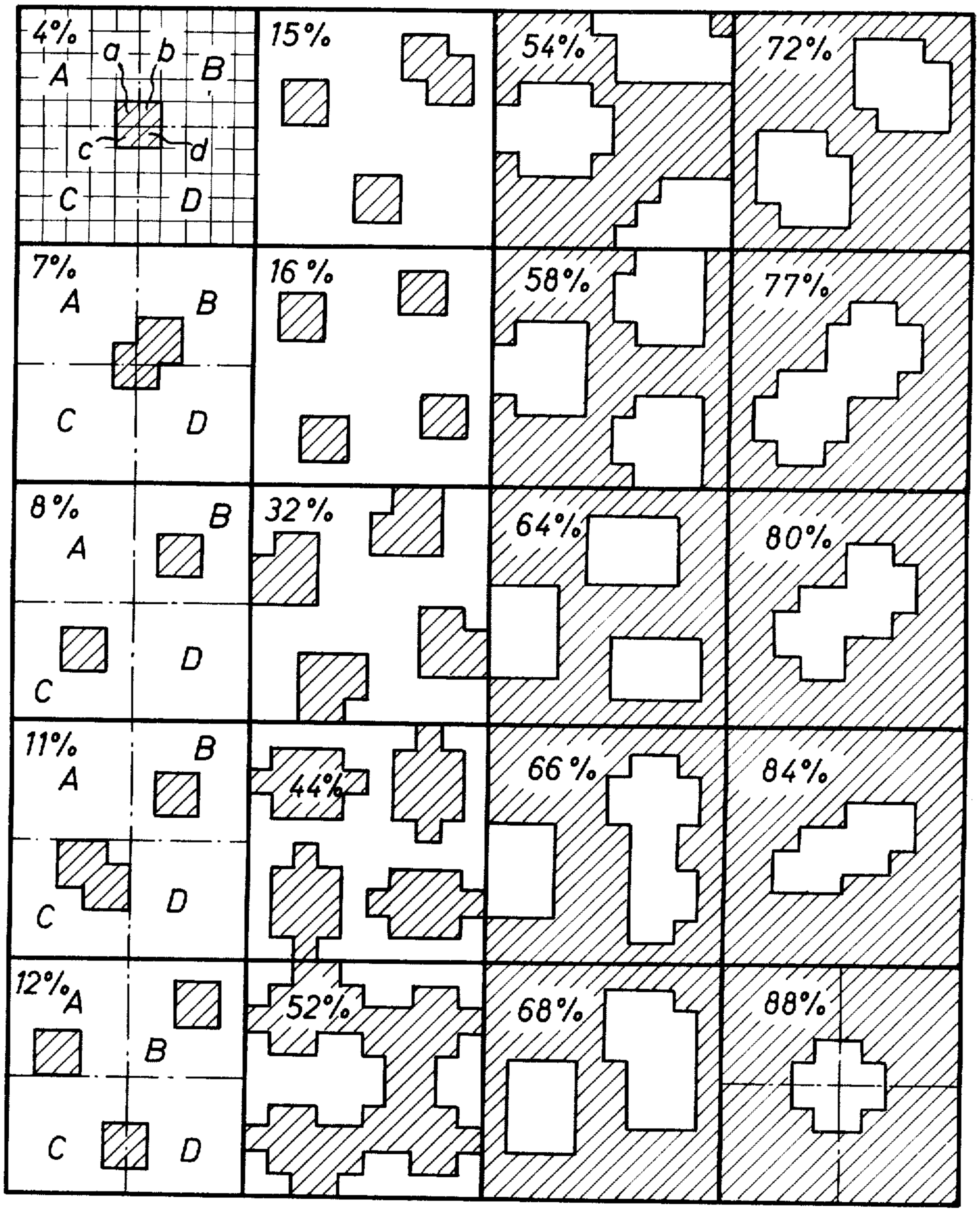
FIG. 1 illustrates an example of an embodiment of the invention in which various covering spot arrangements for a plurality of tone values are illustrated within partial areas of the various raster sections.

Referring to FIG. 1, there is illustrated 20 representative raster sections, each of which is divided into four partial or sub areas A, B, C, D in which is recorded information with respect to the different tone values. The number appearing in each field A of the various sections indicates the percentage of coverage which the particular raster section represents. As illustrated in the section representing 4%, each of the partial areas A, B, C and D is subdivided into 5 × 5 further covering spots whereby each partial area contains 25 coverage possibilities and each raster section 100 coverage possibilities, in view of which 100 covering steps can be depicted for corresponding tone value steps. Thus, an example of a low tone value, i.e. the tone value 4, is illustrated in the section designated 4%, and the indicated member value thus corresponds to the percentage of coverage. This tone value corresponds to the smallest raster dot area which can be printed and thus consists of four covering spots, A, B, C, D which are recorded as a coherent area, the center of which coincides with the center of the section or the common point of the four partial areas A, B, C and D.

With the tone value designated 7%, seven covering spots are distributed over the partial areas with the central point being maintained and the configuration of this area can be efficiently printed. With a tone value of 8%, the first subdivision of the covering area takes place, and in this case, in addition to symmetry with respect to the center point, the effective centers of the divisions are evenly distributed within the raster section. This is achieved in the example illustrated by effecting division when twice the size of the smallest raster dot area which can be printed, has been exceeded. The effective centers of the two newly created printing raster dots are thus located in the partial areas B and C.

If the size of the printing raster dot areas further increase another division is carried out, as indicated in the case of the tone value 12% when a dot reaches twice the size of the smallest raster dot area which can be printed.

Starting with the tone value 16%, only an enlargement of the respective covering spots will take plate. However, in this event, a selection of the covered and uncovered areas of the raster fields is effected, in addition to the coverage determination with respect to the tone value, in accordance with the achievement of even distribution and the best printability of the covering spots created. Thus, the smallest dot which cannot be printed in the tone value 88%, is, for example, larger than the smallest dot of the tone value 4% which can be printed.

Figure 2:
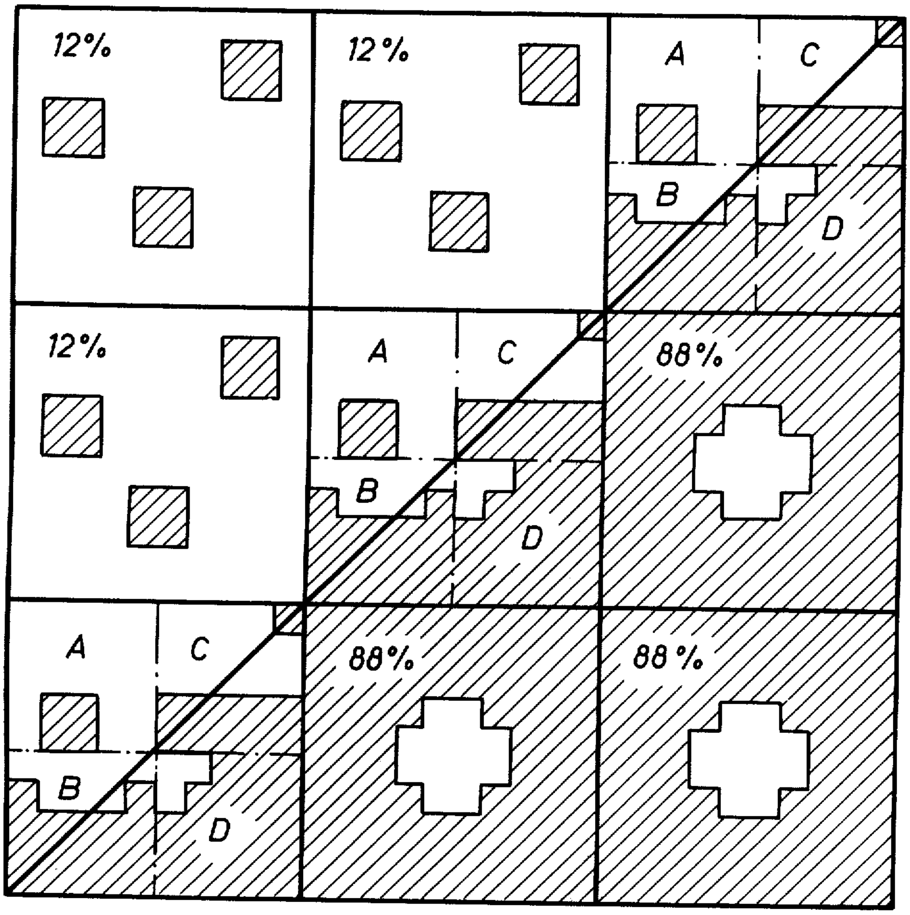
FIG. 2 illustrates a covering spot arrangement within several raster sections with a diagonal tone value juncture.

FIG. 2 represents a transition fron one tone value to another, approximately in a diagonal direction within the respective fields A and D from 12 to 88% coverage while the partial areas B and C effect a tone value 54% and the partial area D from the tone value 88% of FIG. 1. The tone value 54%, produced during the scanning, has a medium value between the two border values 12 and 88%. As will be apparent from a refernce to FIG. 2, a very fine resolution is achieved at the border between the two values, which distinctly and relatively sharply divides the section area into a light and a dark zone, following the contour of the original.

While it is assumed in the above examples that the configurations which are to be printed are stored in a storer and are recalled therefrom by the associated tone value which has been produced during the scanning of the original, a further division of the printing area of the raster sections enables utilization of considerably less complicated switching matrixes in conjunction with the storer. However, a prerequisite for the use thereof is that the tone values are available in binary coded form.

Figures 3, 4:
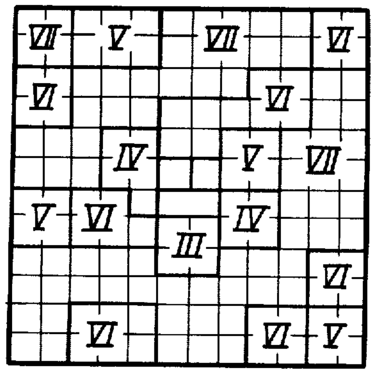
FIG. 3 represents a plan or pattern of various covering spot arrangements for a further illustrative embodiment of the invention.
FIG. 4 is a table of the individual tone values for the covering surface of the raster sections for the example illustrated in FIG. 2.

Referring to FIGS. 3 and 4, each column of a tone value binary number is provided with one or more partial areas which altogether represent a subdivision into the covering spots of FIG. 3 which can be printed. The entire raster section of FIG. 3 is divided into 12 × 12 of the smallest covering spots which can be printed, which in each case form the partial areas 0 to VII, which partial areas are filled in if the tone value number of the respective column contains a 1. The common size of the area of all partial areas denoted with the same Roman number corresponds with the column value of the respective binary number. The distribution of the partial areas involves the principal enumerated, with the low tone values employing a centrally located printing dot which is divided for higher tone values and distributed across the area.

FIG. 4 illustrates a plan according to which the covering spots and uncovered areas are assigned to the respective tone values. The respective binary numbers for some of the tone values are indicated, from which the surface coverage of such tone values results by addition of the respective partial areas in FIG. 3. The seven digital binary numbers makes it possible to achieve a tone value gradation of 0–128 tone value steps, which reflect coverage from 0–100%. In addition, the number of covering spots which forms a printing area is designated for such tone values. The gradation sequence of the respective area coverage takes place in almost two powers. In order to explain how the tone value gradation is achieved, there is indicated in the right-hand column of FIG. 4 the area coverage of the individual tone values, calculated as percentages.

It should be noted that the areas I and II should be located as centrally as possible and that as many areas of different steps as possible should be in contact. Furthermore, there is provided an exposed area 0 which is exposed in cases involving all binary numbers from 0 up to the medium tone value No. 63. This improves the gradation course in the border area of the first and last printable dots.

Figure 5:
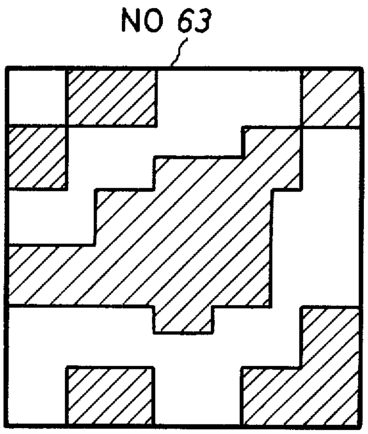
FIGS. 5 and 6 illustrate the transition from one tone value step to the next.
Figure 6:
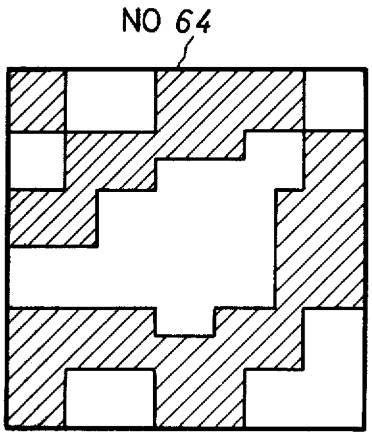

FIGS. 5 and 6 illustrate the transition of the tone value step No. 63 to the tone value step No. 64, in which the binary number 0111111 is assigned to the tone value No. 63 and the binary number 100000 to the tone value No. 64. The coverages of the partial areas shown in FIGS. 5 and 6 result from an arrangement illustrated in FIG. 3. It will be noted that this transition appears like a positive-negative transition, in which, however, as a result of the distribution of the covering spots in accordance with the invention, a balanced distribution is maintained of the tone values within the area.

Figure 7:
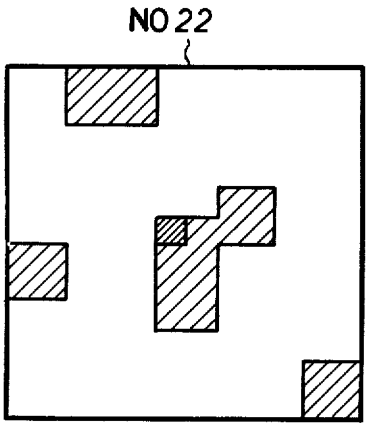
FIG. 7 illustrates an example of a covering spot arrangement for a low or light tone value.

FIG. 7 illustrates a further example of a tone value, representing the tone value step No. 22 which has the binary No. 0010110. It will be particularly noted that here also a substantially balanced distribution of the covering spots within the partial areas of the raster sections is achieved.

Figure 8:
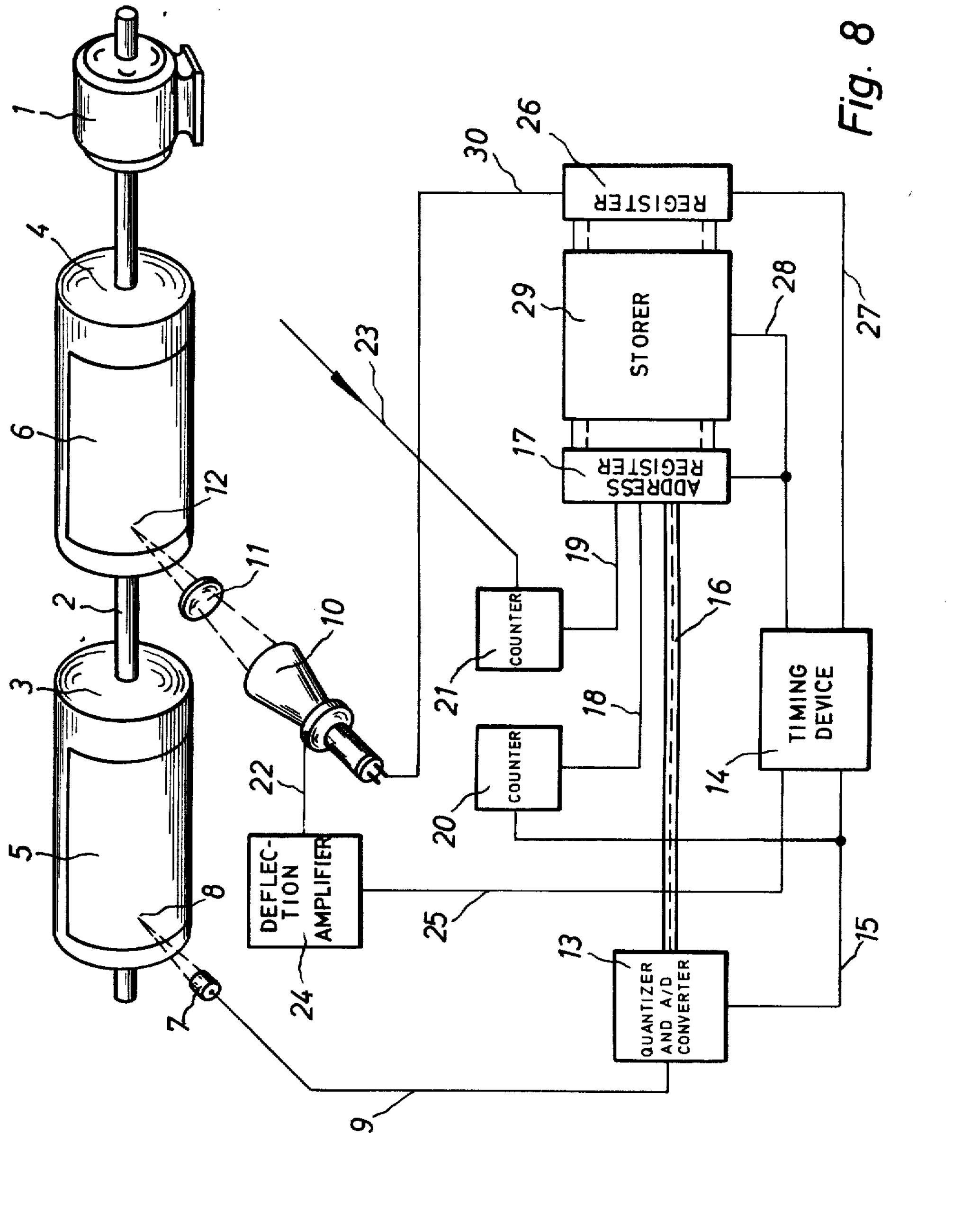
FIG. 8 is a semi-schematic figure illustrating, in block form, an example of a circuit for practising the invention.

FIG. 8 illustrates, semi-diagrammatically, apparatus by means of which the embodiment of the invention illustrated in FIG. 1 can be achieved.

The mechanical structure comprises electric motor 1 having a drive shaft 2 which carries drums 3 and 4, which are thus uniformly and continuously rotated. An image original 5 is mounted on the drum 3 and a light sensitive sheet 6 mounted on the drum 4. A suitable optical scanning member 7 scans the original 5 at an image point 8, supplying analogous electrical voltages to the line 9 which correspond in magnitude to the tone values at the scanned image point 8. After passage through several electronic devices which will be subsequently described, the voltages reach an electron beam tube 10 in the form of control values which control the brightness of a light dot, produced on the screen by means of an electron beam. Such light dot is projected on the light sensitive sheet by means of a suitable optical system 11 and records at the point 12 a reproduction image corresponding to the control data.

Following each revolution of the drums an advance takes place in axial direction by an amount equivalent to the width of a partial area, which advance is required to insure reproduction of the image original over the entire area involved.

The analogous voltages supplied over the line 9 are conducted to a device 13 containing a quantizer in form of a A/D-converter. The device 13 is supplied from a timing device 14, over a line 15, with timing impulses, the frequency of which is so large that, with the existing circumferential speed of the drums, the impulse intervals correspond to the height of the partial areas of the raster fields. The timing impulses are generated or synchronized by the drum revolution in a wellknown manner and each timing impulse at the device 13 resolves the voltage then applied to the line 9, as to a tone value step and transmits the numerical value of this step, in binary coded form, over a cable 16 to an electronic address register 17. The binary number comprises the initial address of the space in the storer which contains the data for the recording of all partial area elements forming the raster section of determined tone value. The raster section is divided into several partial areas, A, B, C and D, corresponding to FIG. 1 and each partial area is again divided into a plurality of the smallest covering spot units. Each of such raster sections contains, in partial areas, covering spots which correspond to the coverage value of the respective tone value.

The data for each individual partial area raster section of the storer can be addressed as follows. The number of the called tone value step is registered in the address register 17 as a binary number. This address register, in addition is also connected with ring counters 20 and 21 over lines 18 and 19. An adding unit in the address register adds the numbers, which are presented over the lines 18 and 19, to the stored tone value number. Corresponding to the alternating sequence of the partial areas A and C, the counter 20 transmits the values 0 or 1 over the line 18 to the address register 17. After the transition into 0 position, recording on the first partial area A begins, the further partial area B following by advancement of the counter 20 into position 1. The course progresses normally until the entire image line has been recorded.

The counter 21 is in a 0 position during recording in the entire first columnwise sequence of partial areas, and prior to the initiation of recording of the next sequence of partial areas, or prior to the beginning of the next drum rotation, an advance equal to the width of a partial area takes place at both the scanning and recording sides. An impulse is created by such an advancement which, over line 23, switches the counter 21 by one unit, which is a number corresponding to the address difference of the data group which includes a partial area of a raster image.

The next operation is the recording of a second sequence of partial areas, in which consecutively and alternately all partial areas B and D are entered, and subsequent to the advancement of the counter 21 the third sequence of partial areas will be recorded. The process continues until the reproduction is completed.

Initially one partial area forms a recording unit and in order to record such partial area with a specific tone value, the initial address is designated by the image signal of the storage area which contains the raster section involving the particular partial area. The designation of the initial addresses takes place over cable 16. The counters 20 and 21 increase the initial address in the address register 17 whereby the data relating to the partial area designated is recorded with correct position within the raster field.

This operation remains the same even if small area elements are recorded individually or in groups instead of the partial areas. By means of the pulse at the input of the counter 20, the frequency of which is higher, corresponding to a finer division, it can be achieved that during the recording of the sequence of partial areas, the data of the recording line corresponding to the desired position within the raster section will control the electron beam. A partial area consists of several recording lines and the frequency of the horizontal deflection of the electron beam, which is effected over line 22 by a deflection amplifier 24, must be correspondingly dimensioned. An impulse having a frequency higher relative to the tone value recording impulse, in accordance of the division of the partial area into recording lines, is supplied over a line 25 and synchronizes the deflection amplifier 24. During such deflection, i.e. during the recording time of a horizontal recording line, the beam speed is constant and the retrace time is small relative to the recording time.

In this case, deflection of the beam in vertical direction is not required as relative vertical movement is achieved as a result of drum movement. However, where electronic photo-composing devices are involved, an additional vertical control of the electron beam will be necessary as the recording carrier then remains stationary during the recording operation. However, when employing a photo-composing device, all other function characteristics will correspond to those illustrated in FIG. 8, in view of which, a specific example of electrical circuitry therefor is omitted.

During the horizontal deflection, the electron beam will be of varying intensity under the control of voltage supplied by the register 26, which is also permanently connected to the pulse generator 14 over a line 27. If a recording line comprises 12 dot units, pulses must be supplied at the register which are 12 times greater in frequency than the pulses on line 25. In practice, the frequency of the pulse on line 30 is still higher, for example 14 times, as the retrace time following a horizontal deflection should not be completely ignoted.

The register 26 may be a so-called shift register and functions as an interim storer between the data storer 29 and the recording tube 10.

Figure 9:
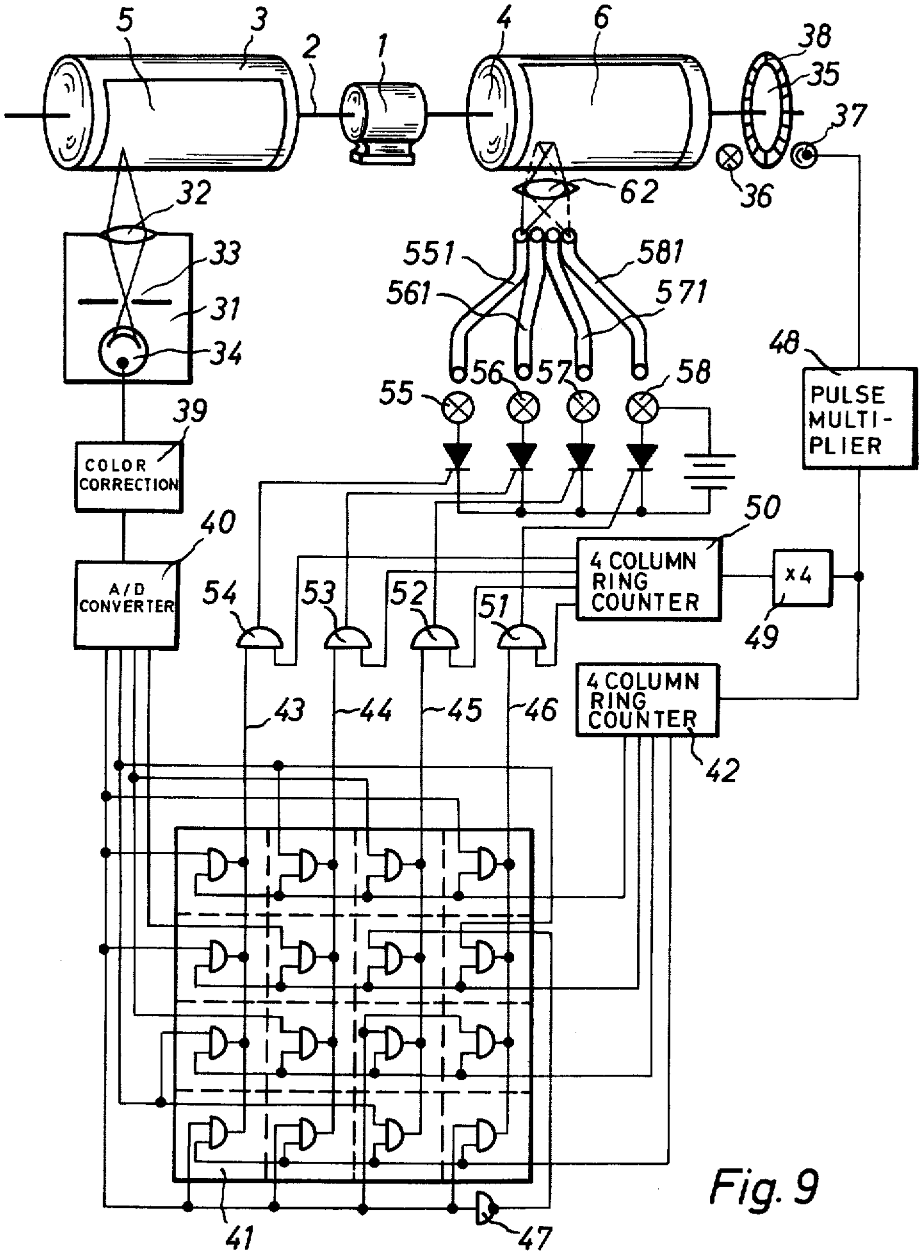
FIG. 9 is a similar figure illustrating a modified circuit employing binary coded tone values.

FIG. 9 illustrates an embodiment employing binary coded tone values and again, as illustrated in FIG. 8, a scanning drum 3 and recording drum 4 provided, which are disposed on a common shaft 2 of a motor 1. The scanning drum carries the image original 5 to be scanned and the recording drum 4 a light sensitive sheet 6. A suitable scanning optical system 31 is provided, comprising a schematically illustrated lens system 32, a shutter 33 and an optical-electrical transducer 23. In addition, a pulse generator 35, operative mounted on the shaft 2, is cooperable with a light source 36 and an optical-electrical transducer 37, the pulse generator 35 being provided with slots 38 therein adapted to control the passage of light from source 36 to the transducer 37, and thus determine the raster pulse frequency. Such pulse generator is provided for effecting synchronization of the recording operation with the drum rotation.

The image original 5 is scanned along a spiral line during drum rotation by the axial advance of the scanning head 31, with the output signal of the optical-transducer 34 being conducted to a generally known color correction unit 39, the output of which is conducted to the analog-digital converter 40. The individual columns of the binary coded tone values, 0 or 1, appear at the outputs 1 to 4 of the analog-digital converter 40. For simplicity, only four columns, i.e. only four are outputs, are illustrated. As will be apparent from a reference to FIG. 10, only four times four exposure areas per raster field are associated with these outputs. In the practical application of the method, six to eight binary columns and more than 100 exposure areas will be employed.

Figure 10:
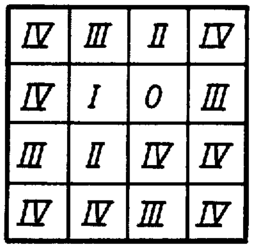
FIG. 10 represents a raster field employing four times four covering spots, for explanation of the mode of operation of the circuit illustrated in FIG. 9.

The outputs of the analog-digital converter are conducted to a switching matrix 41 comprised of AND gates which are associated with the individual exposure areas of FIG. 10. Each gate is adapted to be opened by a binary number and a line impulse supplied by a line ring counter 42 whereby the outputs of the gates of only one line can appear on the exposure signal lines 43 to 46. However, only those outputs are supplied whose binary numbers happen to be 1 at the particular instant. If the tone value IV happens to be 0 a 1 will be applied to the output of an inverter 47 and the field 0 in the second line will be exposed, which will be the case if the light half of the tone value is involved.

If the complete exposure of a line is not possible sinumtaneously because only one light source with only one mobile light point is employed, as is the case with exposure produced by cathode beam tube, from the pulse created by the pulse generator 35, a higher pulse frequency is created by multiplication of the matrix column number in the pulse multipliers 48 and 49, by means of which, over a column ring counter 50, the sequence of the dots can be successively achieved over suitable switching means such as AND gates 51 to 54.

Figure 11:
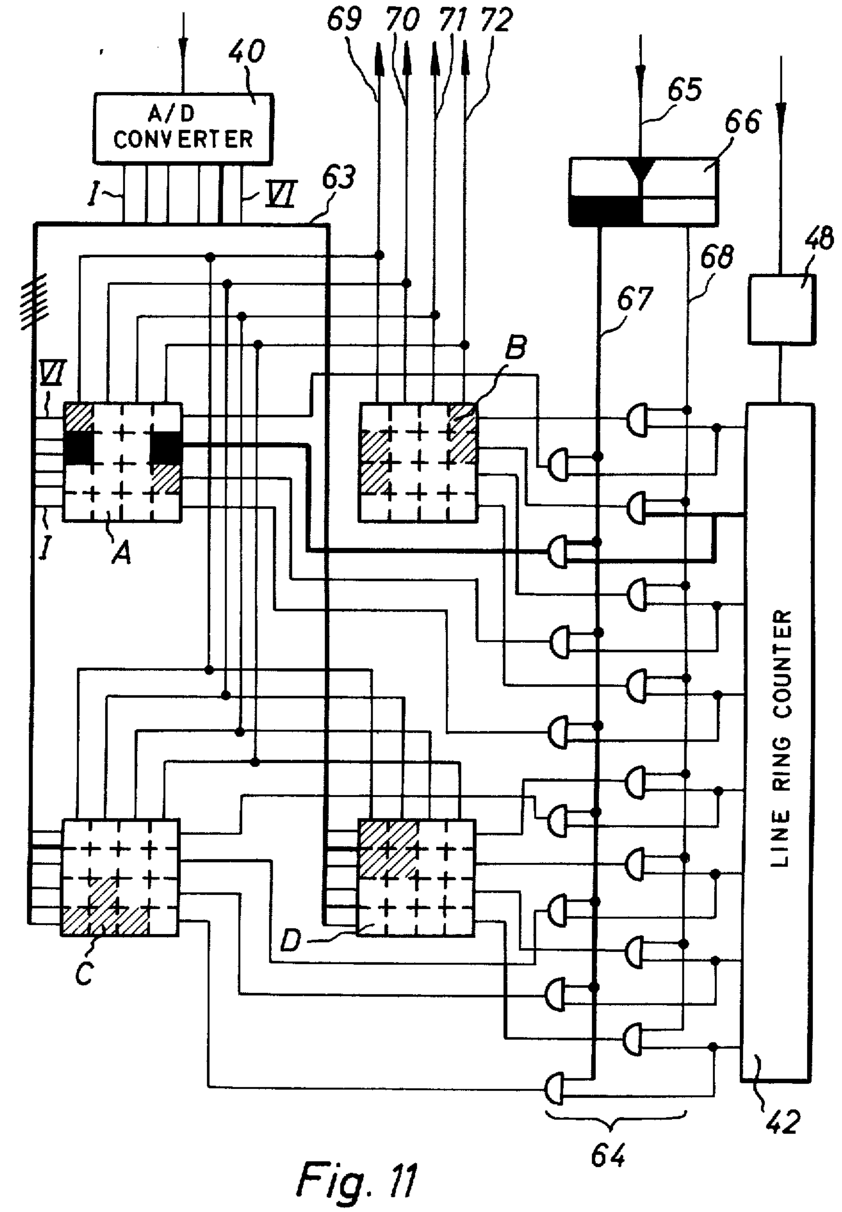
FIG. 11 is a schematic diagram of an electronic circuit for use in the recordation of the covering spots.

Exposure of the sheet 6 can be accomplished by suitable flash lamps 55–58, the light produced thereby being conducted by respective light conductors 551,561, 571 and 581 to an objective lens 62 so that the respective light beams will impact the light sensitive sheet in the form of a line of dots. FIG. 9 is intended merely to illustrate the principle involved, while FIG. 11 illustrates additional electronic details and thus more nearly corresponds to an actual application. In this figure there is illustrated a switching matrix of 8 × 8 exposure points per network section, which is subdivided into four parts A, B, C and D. The analog-digital converter 40 releases a six digital number, and it is assumed that at the instant, of tone value No. 16, the binary number V of all partial matrices C are activated so that in the matrix the respective switching points, which are completely illustrated in line 2, of A are ready to be switched. The six binary column lines have been shown only in a very simple uncomplicated manner for purposes of simplicity with respect to line 63.

In correspondence to the number of matrix lines the line ring counter 42 now provides eight steps which are conducted periodically in a cyclical sequence if the outputs belonging to the second exposure dot line of the ring counter 42 are presently activated. Before such signal can activate the matrix outputs of such line, the gate circuit 64 must be traversed. For this purpose, an impulse is derived from the scanning or recording drum respectively for each revolution, which, over line 65, activates the flip-flop 66 with output 67, 68 being reversed during each drum recording line. If, for example, the line 67 is activated during an entire revolution of the recording drum, the ring counter outputs will only activate the sequence of the light dot lines of the partial matrices A and C. During the next drum revolution only the partial matrices B and D will be recorded. At the instant illustrated, the second line of A is activated whereby the tone value signal V has selected the two completely filled exposure areas and directed them into the recording device over lines 69 and 72. It is not necessary, but it is advisable to feed the tone value signal along with the sequence of the partial matrices. In the case of a slower change, the exactness of the recording resolution is not utilized, while in the case of a more rapid sequence the resolution is improved to a relatively small degree.

Figure 12:
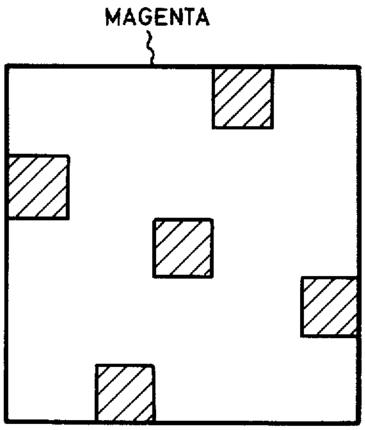
FIGS. 12 through 14 illustrate covering spots of individual tone values of a raster section for three sample colors.
Figure 13:
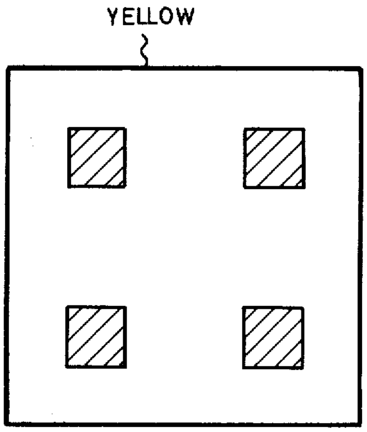
Figure 14:
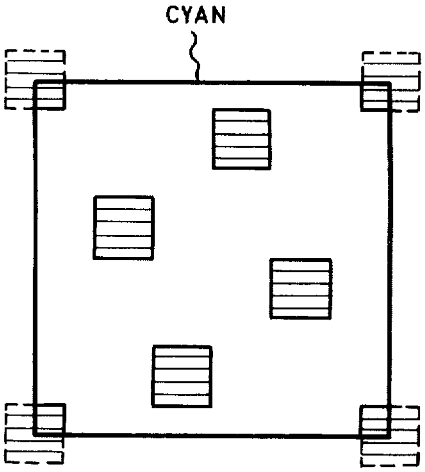
Figure 15:
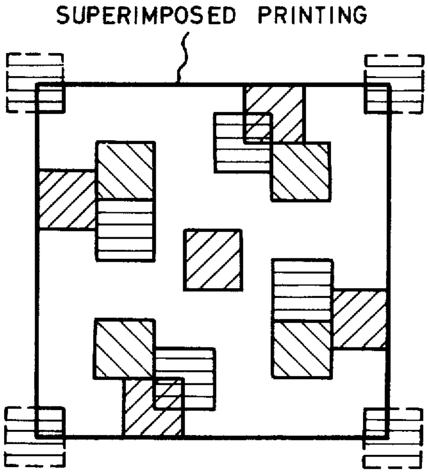
FIG. 15 represents the superimposition of the tone values illustrated in FIGS. 12 to 14.

The disclosure thus far has been directed to the recordation of raster fields for only a single color. FIGS. 12 through 15 are directed to the application of the present method to a multicolor print. FIG. 12 illustrates coverage of a sample color, for example magenta, as determined by the tone values involved in the scanning, while FIG. 13 illustrates another tone value for a sample color yellow and FIG. 14 another tone value for the sample color cyan. The result of the superimposed printing of these three raster fields of the respective sample colors is illustrated in FIG. 15, from which it will be readily noted that there are points at which the printing colors overlie one another or merely tough. It will be appreciated that in the case of larger coverages, i.e. higher tone values a greater superimposition of the printing colors will naturally occur, corresponding to known continuous tone color printing techniques.

Having thus described my invention it will be obvious that although various minor modifications might be suggested by those versed in the art, it should be understood that I wish to embody within the scope of the patent granted hereon all such modifications as reasonably and properly come within the scope of my contribution to the art.

I claim:

1. A method for the rastered reproduction of colored continuous tone images in single or multi-color printing, in which the image original for the individual printing colors are separately scanned optical-electrically to form respective electrical signals which are quantized in accordance with tone value steps, with the quantized signals controlling one or more recording units by means of which a printing form for the individual printing colors is produced, and in which the surface of the printing form is divided into a network of orthogonal raster sections, the individual raster sections being divided into several orthogonal partial areas, with the signals obtained during the scanning being quantized with such a pulse that each partial area is provided with a quantization pulse, the recording units being so controlled by means of the signals derived during the quantization that within the partial areas of the raster sections one or more coverage spots are recorded on the printing form as printing dots, the surface coverage of which has a size corresponding to the associated tone value, characterized by recording up to a tone value which corresponds to the size of the smallest printable dot the coverages formed on the partial areas within the sections as a single coherent covering spot, enlarging such covering spot with increasing tone values, dividing the spot into two covering spots when approximately twice the size of the smallest printable dot is reached, similarly enlarging and dividing the covering spots with increasing tone values, and enlarging the covering spots up to a predetermined tone value, and with a further increase in tone value, decreasing the size of the uncovered areas until they are reduced to the smallest printable size, and with further increasing tone value decreasing the number of the uncovered surface areas.

2. A method according to claim 1, comprising, recording within the raster section, approximately 2 to 10 covering spots for achieving high tone values of over approximately 100.

3. A method according to claim 1, comprising designating the tone value steps by binary coded numbers so that their individual columns in each case correspond to a predetermined number and arrangement of covering spots within the partial areas of the raster sections, whereby its entire area corresponds to evaluation of the column value of the binary number, and increasing the covering area assigned to one column of the binary number with increase in column number of the binary number by approximately 2, and recording the tone values of the covering areas which correspond columns of the binary number exhibiting the value 1.

* * * * *